(12) United States Patent
Yanada et al.

(10) Patent No.: US 7,834,914 B2
(45) Date of Patent: Nov. 16, 2010

(54) IMAGE PICKUP APPARATUS AND SIGNAL PROCESSOR

(75) Inventors: Takashi Yanada, Hachioji (JP); Yoshinobu Tanaka, Hachioji (JP)

(73) Assignees: Olympus Imaging Corp., Tokyo (JP); Olympus Corporation, Tokyo (JP)

( * ) Notice: Subject to any disclaimer, the term of this patent is extended or adjusted under 35 U.S.C. 154(b) by 557 days.

(21) Appl. No.: 11/820,233

(22) Filed: Jun. 18, 2007

(65) Prior Publication Data
US 2007/0291137 A1      Dec. 20, 2007

(30) Foreign Application Priority Data
Jun. 20, 2006    (JP)    ............... 2006-170468

(51) Int. Cl.
*H04N 5/235*    (2006.01)
(52) U.S. Cl. .................. 348/222.1; 348/230.1
(58) Field of Classification Search ........... None
See application file for complete search history.

(56) References Cited
U.S. PATENT DOCUMENTS
2004/0189844 A1*  9/2004  McCaffrey et al. .......... 348/308

2006/0077261 A1    4/2006   Tanaka et al.

FOREIGN PATENT DOCUMENTS

| CN | 1761287    | 4/2006 |
|----|------------|--------|
| JP | 62-092587  | 4/1984 |
| JP | 2003-023555| 1/2003 |

OTHER PUBLICATIONS

First Notification of Office Action for Chinese Patent Application No. 2007101055478, mailed Oct. 24, 2008 (5 pgs.) with translation (6 pgs.).

* cited by examiner

*Primary Examiner*—David L Ometz
*Assistant Examiner*—Angel L Garces-Rivera
(74) *Attorney, Agent, or Firm*—Straub & Pokotylo; John C. Pokotylo

(57) ABSTRACT

An image pickup apparatus includes an imaging unit outputting two kinds of imaging signals, that is, a first imaging signal and a second imaging signal. A first calculating unit selectively processes the two kinds of imaging signals to generate an AE evaluation value. A second calculating unit selectively processes the two kinds of imaging signals to generate a luminance signal, and generates an AF evaluation value from the generated luminance signal. An image processor executes image processing with respect to the two kinds of imaging signals to obtain an image data.

19 Claims, 16 Drawing Sheets

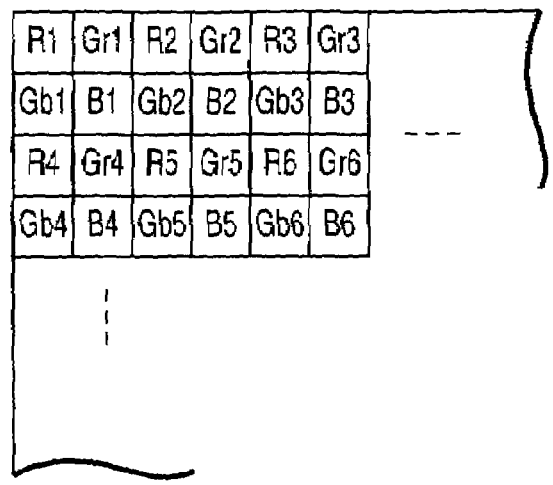
F I G. 2
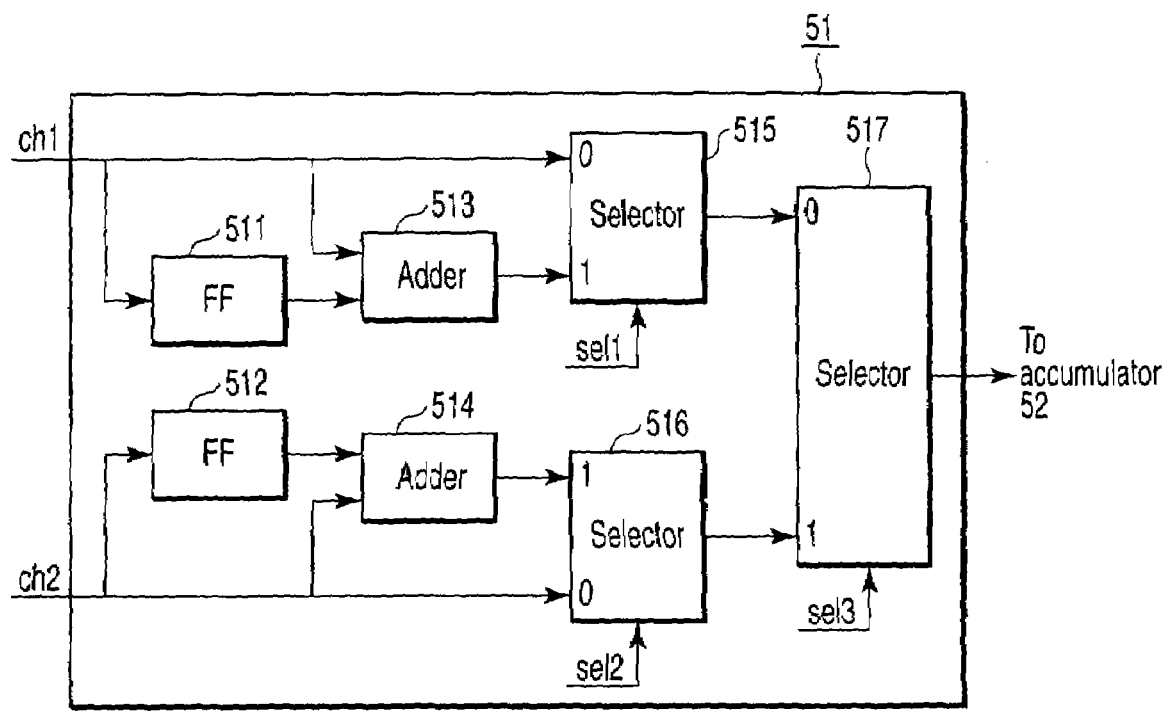
F I G. 3

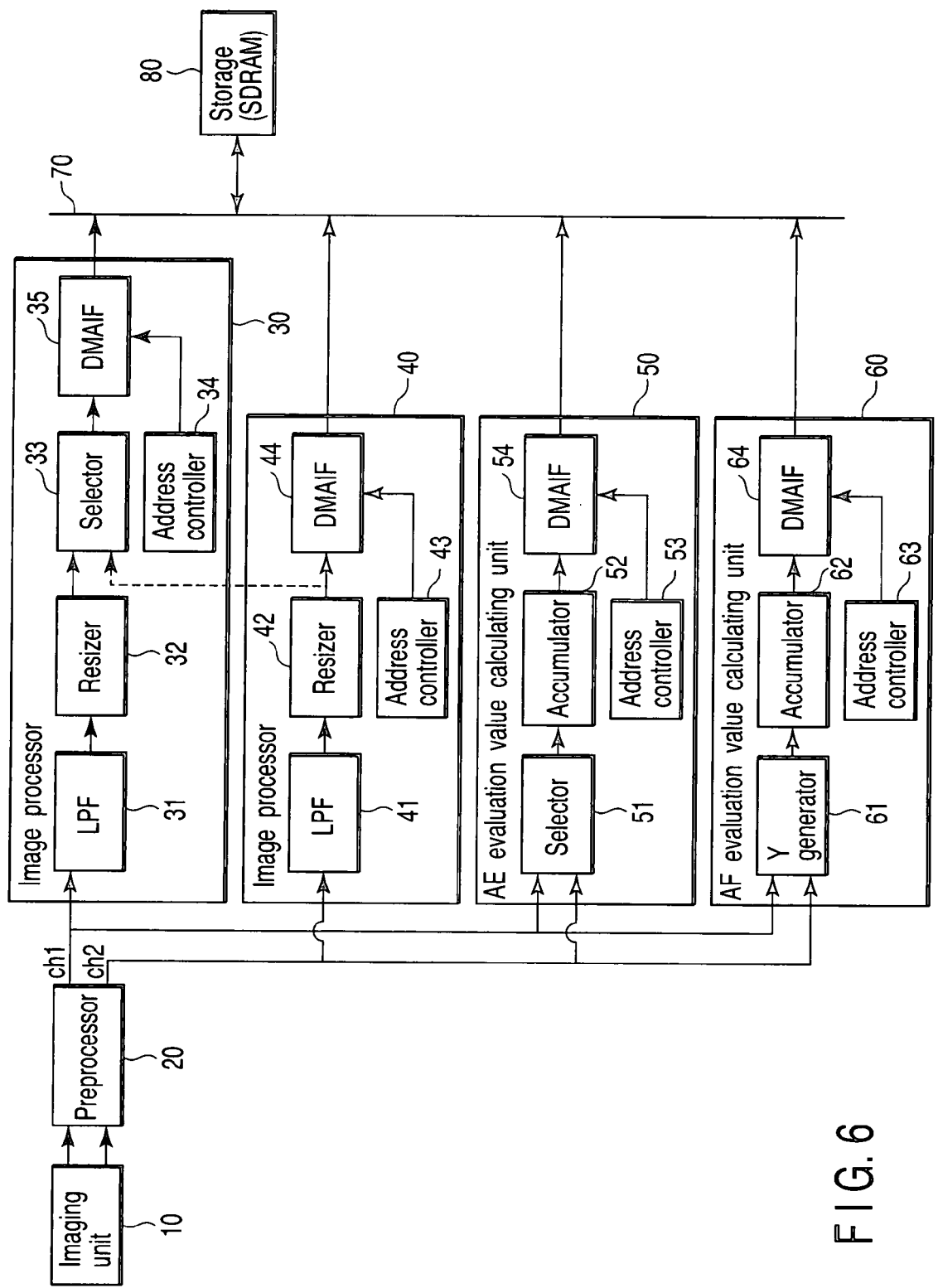
F I G. 6

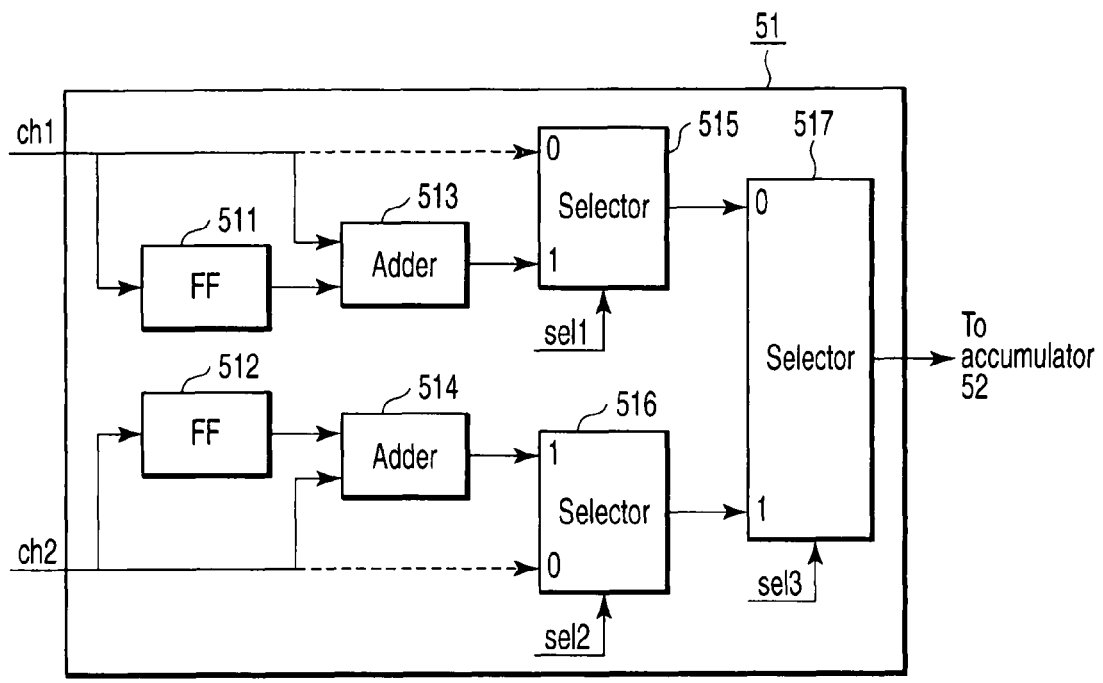
F I G. 14
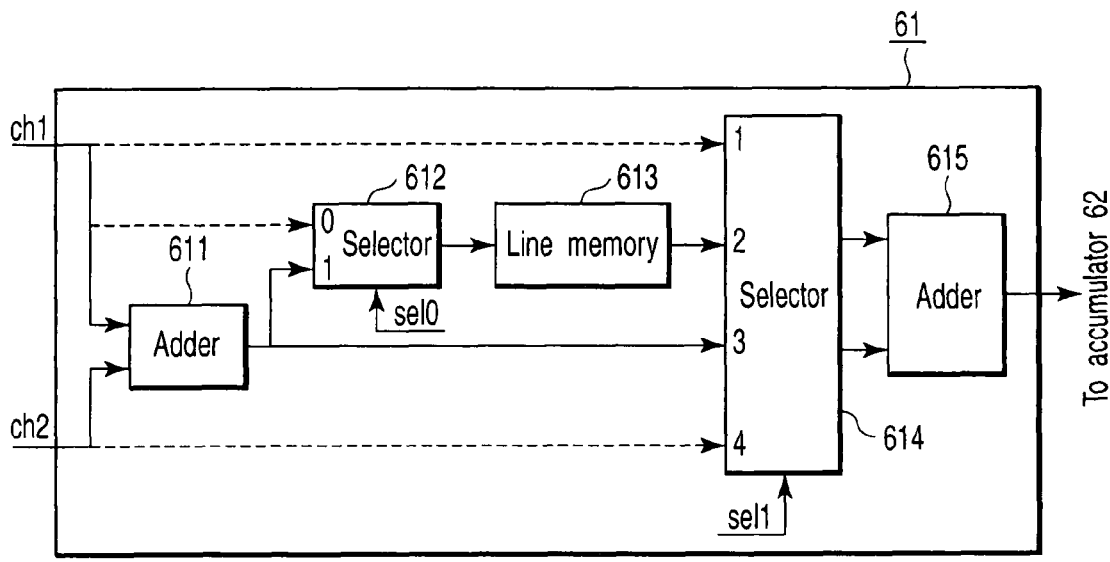
F I G. 15

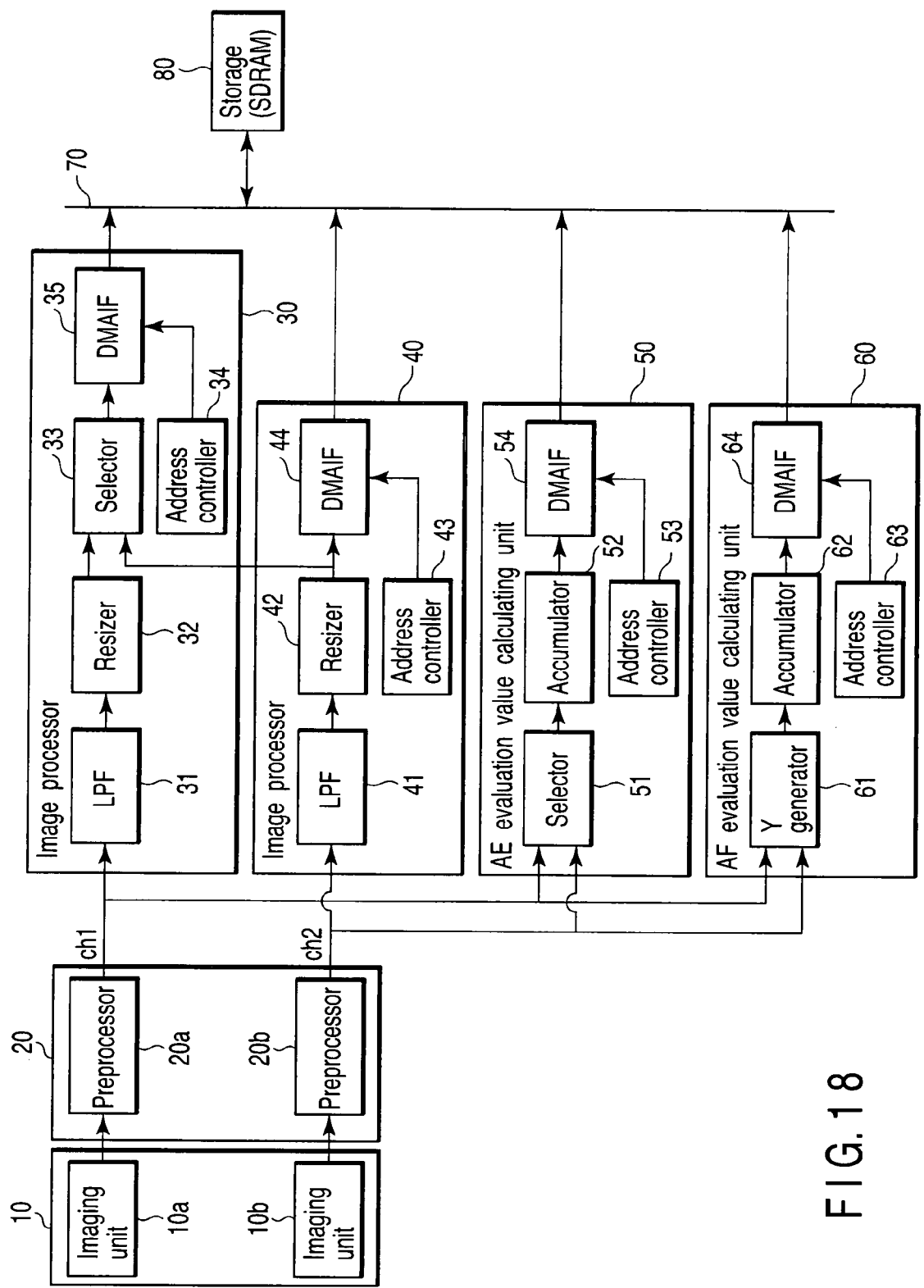
F I G. 18

IMAGE PICKUP APPARATUS AND SIGNAL PROCESSOR

CROSS-REFERENCE TO RELATED APPLICATIONS

This application is based upon and claims the benefit of priority from prior Japanese Patent Application No. 2006-170468, filed Jun. 20, 2006, the entire contents of which are incorporated herein by reference.

BACKGROUND OF THE INVENTION

1. Field of the Invention

The present invention relates to an image pickup apparatus and a signal processor.

2. Description of the Related Art

Recently, an imaging unit built in an image pickup apparatus (e.g., digital camera) has various forms. For example, Jpn. Pat. Appln. KOKAI Publication No. 2003-23555 discloses the following image pickup apparatus. The image pickup apparatus has an imaging unit capable of imaging a moving image and a still image using independent imaging optical system. In the image pickup apparatus disclosed in the foregoing Publication No. 2003-23555, an imaging optical system for imaging a moving image and an imaging optical system for imaging a still image are independently provided. An imaging signal obtained via one imaging optical system and an imaging signal obtained via the other imaging optical system have an asynchronous relationship. These imaging signals are selectively input to an imaging signal processor, and thereafter, subjected to signal processing.

Moreover, Jpn. Pat. Appln. KOKAI Publication No. S62-92587 discloses the following imaging unit. The imaging unit is configured to simultaneously output an imaging signal of two pixels adjacent to the vertical direction of the imaging device having a Bayer-array color filter attached to an imaging surface using another channel. In addition, there is disclosed the imaging unit configured to simultaneously output an imaging signal of two pixels adjacent to the horizontal direction of the imaging device having a Bayer-array color filter attached to an imaging surface using another channel. In the imaging unit having the foregoing configuration, an imaging signal output from each channel of the imaging device is input to an imaging signal processor, and then subjected to signal processing.

BRIEF SUMMARY OF THE INVENTION

According to a first aspect of the present invention, there is provided an image pickup apparatus comprising: an imaging unit which outputs two kinds of imaging signals including a first imaging signal and a second imaging signal; a first calculating unit which selectively processes the two kinds of imaging signals to generate an AE evaluation value; a second calculating unit which selectively processes the two kinds of imaging signals to generate a luminance signal, and generates an AF evaluation value from the generated luminance signal; and an image processor which executes image processing with respect to the two kinds of imaging signals to obtain an image data.

According to a second aspect of the present invention, there is provided a signal processor processing two kinds of imaging signals including a first imaging signal and a second imaging signal, comprising: a first calculating unit which selectively processes the two kinds of imaging signals to generate an AE evaluation value; a second calculating unit which selectively processes the two kinds of imaging signals to generate a luminance signal, and generates an AF evaluation value from the generated luminance signal; and an image processor which executes image processing with respect to the two kinds of imaging signals to obtain an image data.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 2 is a view to showing the Bayer array;

FIG. 3 is a block diagram showing the detailed configuration of a selector 51;

FIG. 6 is a block diagram to explain setting of image processors 30 and 40 when the imaging unit of FIG. 5 is used;

FIG. 14 is a block diagram to explain setting of an AE evaluation value calculating unit 50 when the imaging unit of FIG. 12 is used;

FIG. 15 is a block diagram to explain setting of an AF evaluation value calculating unit 60 when the imaging unit of FIG. 12 is used;

FIG. 18 is a block diagram to explain a third configuration example of the imaging unit 10;

DETAILED DESCRIPTION OF THE INVENTION

One embodiment of the present invention will be hereinafter described with reference to the accompanying drawings.

Figure 1:
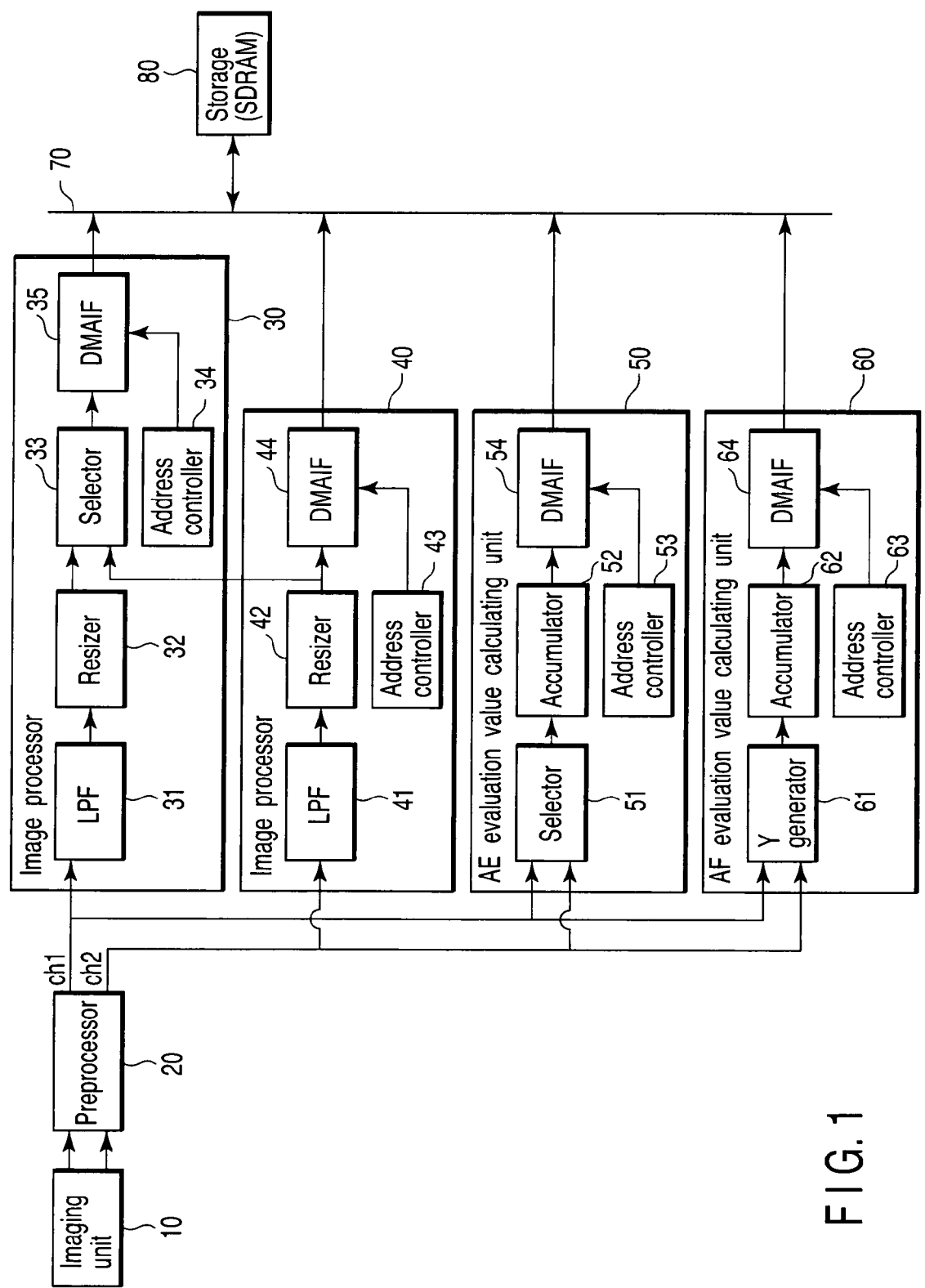
FIG. 1 is a block diagram showing the principal configuration of an image pickup apparatus according to one embodiment of the present invention.

FIG. 1 is a block diagram showing the principal configuration of an image pickup apparatus according to one embodiment of the present invention. The image pickup apparatus shown in FIG. 1 comprises an imaging unit 10, a preprocessor 20, a signal processing unit, a data bus 70 and a storage device 80. In FIG. 1, the signal processing unit is composed of image processors 30, 40, an AE evaluation value calculating unit 50 and an AF evaluation value calculating unit 60.

The imaging unit 10 is composed of at least one imaging optical system and at least one imaging device arranged in the rear of the imaging optical system. The imaging optical system collects light from a subject (not shown) onto the imaging device. The imaging device is a CCD imaging device, for example. The imaging device receives light from a subject (not shown), and then outputs an imaging signal corresponding to the received light. An imaging surface of the imaging device is attached with a Bayer-array color filter shown in FIG. 2. The imaging unit 10 of this embodiment is usable as an imaging unit having various configurations to output various kinds of imaging signals described later.

The preprocessor 20 executes the following various preprocessings. One is correlation double sampling (CDS) for removing a noise component contained in an imaging signal output from the imaging unit 10. Another is amplification of the imaging signal, and another is a processing of digitizing the imaging signal.

The foregoing image processors 30 and 40 execute predetermined image processing with respect to the imaging signal output from the preprocessor 20 to obtain an image data. In FIG. 1, there is shown a configuration of executing resizing for displaying an image on a display device (not shown) as an example of the image processing. In this case, image processing except resizing may be executed as the image processing. As shown in FIG. 1, the image processor 30 is composed of a low pass filter (LPF) 31, a resizer 32, a selector 33, an address controller 34 and a DMAIF 35. Moreover, the image processor 40 is composed of a LPF 41, a resizer 42, an address controller 43 and a DMAIF 44. The foregoing selector 33, address controller 34, DMAIF 35, address controller 43 and DMAIF 44 forms a storage processor The LPFs 31 and 41 remove a high-frequency component of the imaging signal input from the pre-processor 20 to prevent aliasing distortion by resizing in the after-stage. The resizers 32 and 42 resize the imaging signal input from the LPFs 31 and 41 to obtain image data. The selector 33 is connected to resizers 32 and 42. The selector 33 selects image data from either of resizers 32 and 42, and thereafter, outputs it to the DMAIF 35. The address controllers 34 and 43 control address when the image data is written in the storage 80. The DMAIFs 35 and 44 make a DMA transfer of the image data.

The AE evaluation value calculating unit 50 functions as a first calculating unit. The AE evaluation value calculating unit 50 accumulates an imaging signal corresponding to each of an imaging surface divided into a plurality of areas every color, thereby calculating an AE evaluation value. In the Bayer array, three-color four components such as R, Gr, Gb and B are given. As seen from FIG. 1, the AE evaluation value calculating unit 50 is composed of a selector 51, an accumulator 52, an address controller 53 and a DMAIF 54.

The selector 51 processes the imaging signal processed by the preprocessor 20 so that the accumulator 52 accumulates it every color, and thereafter, outputs it. FIG. 3 is a block diagram showing the detailed configuration of the selector 51. The selector 51 is composed of flip-flops (FF) 511, 512, adders 513, 514, selectors 515, 516 and a selector 517.

The FFs 511 and 512 holds the imaging signal from the pre-processor 20 by one pixel. The adder 513 functioning as a first adder adds the imaging signal from the preprocessor 20 and the imaging signal held in the FF 511, and then outputs the result to the selector 515. The adder 514 functioning as a second adder adds the imaging signal from the preprocessor 20 and the imaging signal held in the FF 512, and then outputs the result to the selector 516.

The selector 515 functions as a first selector. The selector 515 selects either of the imaging signal from the preprocessor 20 and the imaging signal added by the adder 513 according to the setting of a select signal sel1, and outputs it to he selector 517. In this case, the selector 515 selects the imaging signal from the preprocessor 20 if the select signal sel1 is "0". On the other hand, the selector 515 selects the imaging signal from adder 513 if the select signal sel1 is "1". The selector 516 functions as a second selector. The selector 516 selects either of the imaging signal from the preprocessor 20 and the imaging signal added by the adder 514 according to the setting of a select signal sel2, and outputs it to he selector 517. In this case, the selector 515 selects the imaging signal from the preprocessor 20 if the select signal sel2 is "0". On the other hand, the selector 515 selects the imaging signal from adder 514 if the select signal sel1 is "1b". The selector 517 functioning as a third selector selects either of the imaging signal from the selector 515 and the imaging signal from the selector 516 according to the setting of a select signal sel3, and thereafter, outputs it to the accumulator 52. In this case, the selector 517 selects the imaging signal from the selector 515 if the select signal sel3 is "0", while it selects the imaging signal from the selector 516 if the select signal sel3 is "1".

The accumulator 52 functions as an AE evaluation value generator. The accumulator 52 accumulates the imaging signal input from the selector 51 every area and color to calculate an AE evaluation value. In this case, the accumulator 52 is configured to accumulate the imaging signal input in the order of the Bayer array every area and color. The address controller 53 controls a write address when writing the AE evaluation value in the storage 80. The DMAIF 54 makes a DMA transfer of the AE evaluation value.

The AF evaluation value calculating unit 60 functioning as a second calculating unit generates a luminance (Y) signal from the imaging signal processed by the preprocessor 20. The Y signal is obtained by multiplying each of R, Gr, Gb and B by a coefficient, and adding them together. After obtaining the Y signal, the AF evaluation value calculating unit 60 accumulates a Y signal corresponding to each area of the imaging surface divided into a plurality of areas to calculate an AF evaluation value. The AF evaluation value calculating unit 60 is composed of a Y generator 61, an accumulator 62, an address controller 63 and a DMAIF 64.

Figure 4:
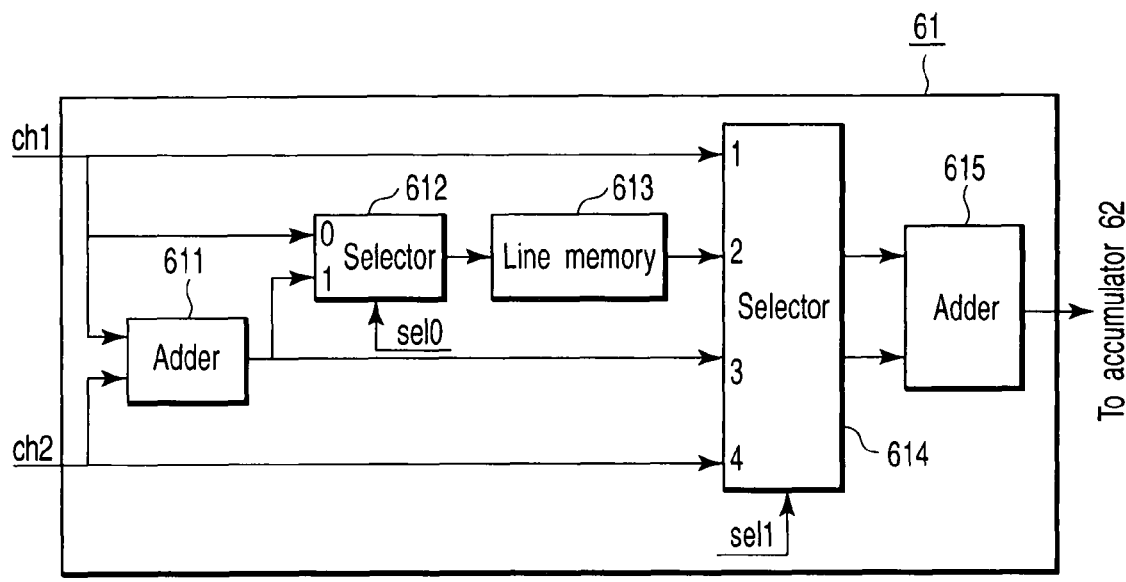
FIG. 4 is a block diagram showing the detailed configuration of a Y generator 61.

The Y generator 61 generates a Y signal from two kinds of imaging signals output from the preprocessor 20, and then outputs it to the accumulator 62. FIG. 4 is a block diagram showing the detailed configuration of the Y generator 61. As seen from FIG. 4, the Y generator 61 is composed of an adder 611, a selector 612, a line memory 613, a selector 614 and an adder 615.

The adder 611 given as a third adder adds imaging signals equivalent to two pixels processed by the preprocessor 20, and thereafter, outputs the result to selectors 612 and 614. The selector 612 functions as a fourth selector. The selector 612 selects either of the imaging signal from the preprocessor 20 and the imaging signal added by the adder 611 according to the setting of a select signal sel0, and then outputs it to the line memory 613. In this case, the selector 612 selects the imaging signal from the preprocessor 20 if the select signal sel0 is "0", while it selects the imaging signal from the adder 611 if the select signal sel0 is "1".

The line memory 613 functions as a holder. The line memory holds the imaging signal output from the selector 612 by one line. The selector 614 functions as a fifth selector. The selector 614 selects either of the imaging signals ("1" and "4" in FIG. 4) from the preprocessor, and the imaging signals from the line memory 613 ("2" in FIG. 4) and the adder ("3" in FIG. 4) 611 according to the setting of a select signal sel1. Then, the selector 614 outputs the selected two kinds of imaging signals to the adder 615. The adder 615 functions as a fourth adder. The adder 615 adds two kinds of imaging signals output from the selector 612 to generate a Y signal, and thereafter, outputs the generated Y signal to the accumulator 62.

The accumulator 62 given as an AF evaluation value generator accumulates the Y signal output from the Y generator 61 every area to obtain an AF evaluation value. The address controller 63 controls a write address when the AF evaluation value is written in the storage 80. The DMAIF 64 makes a DMA transfer of the AF evaluation value.

According to the configuration shown in FIG. 1, the following image processing and operations are simultaneously performed. Specifically, one is image processing executed by the image processors 30 and 40, and another is an AE evaluation value operation by the AE evaluation value calculating unit 50. Another is an AF evaluation value operation by the AF evaluation value calculating unit 60.

The data bus 70 is a transfer path for transferring the image data from the image processors 30 and 40, the AE evaluation value from the AE evaluation value calculating unit 50 and the AF evaluation value from the AF evaluation value calculating unit 60. The storage 80 comprises a SDRAM, for example. The storage 80 temporarily stores various data such as the foregoing image data, AE evaluation value and AF evaluation value transferred via the data bus 70.

The operation of the image pickup apparatus having the foregoing configuration will be hereinafter described.

First, the operation corresponding to the imaging unit 10 outputting two kinds of imaging signals shown in FIG. 5 will be described. The imaging unit 10 shown in FIG. 5 has two output channels, that is, a channel 1 (ch1) and a channel 2 (ch2). The imaging unit 10 shown in FIG. 5 outputs an imaging signal of an odd line (R, Gr line in the Bayer array) for one horizontal period (1H) from the channel ch1. In this case, the foregoing imaging signal is given as a first imaging signal. Moreover, the imaging unit 10 outputs an imaging signal of an even line (Gb, B line in the Bayer array) for one horizontal period (1H) from the channel ch2. In this case, the foregoing imaging signal is given as a second imaging signal.

Figure 5:
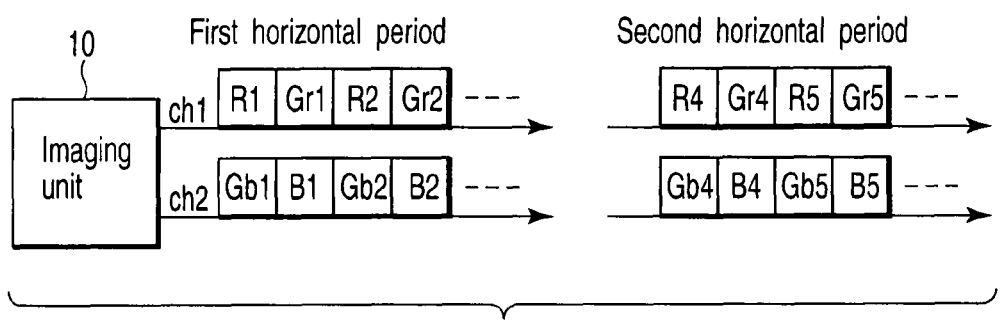
FIG. 5 is a view to explain a first configuration example of an imaging unit 10.
Figure 7:
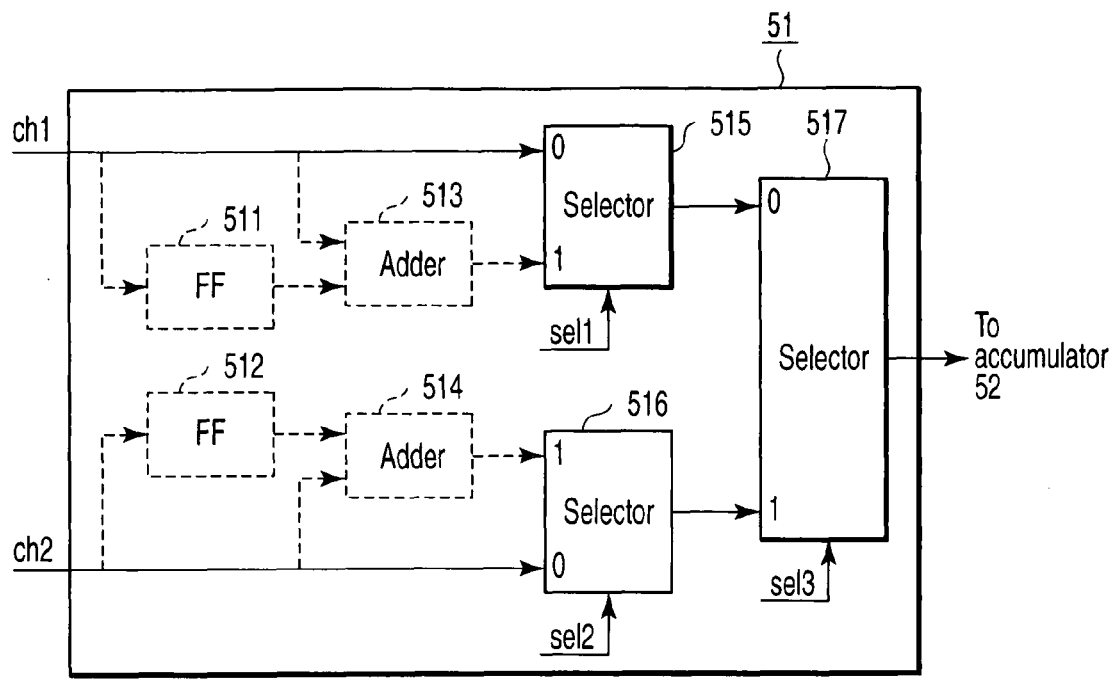
FIG. 7 is a block diagram to explain setting of an AE evaluation value calculating unit 50 when the imaging unit of FIG. 5 is used.
Figure 8:
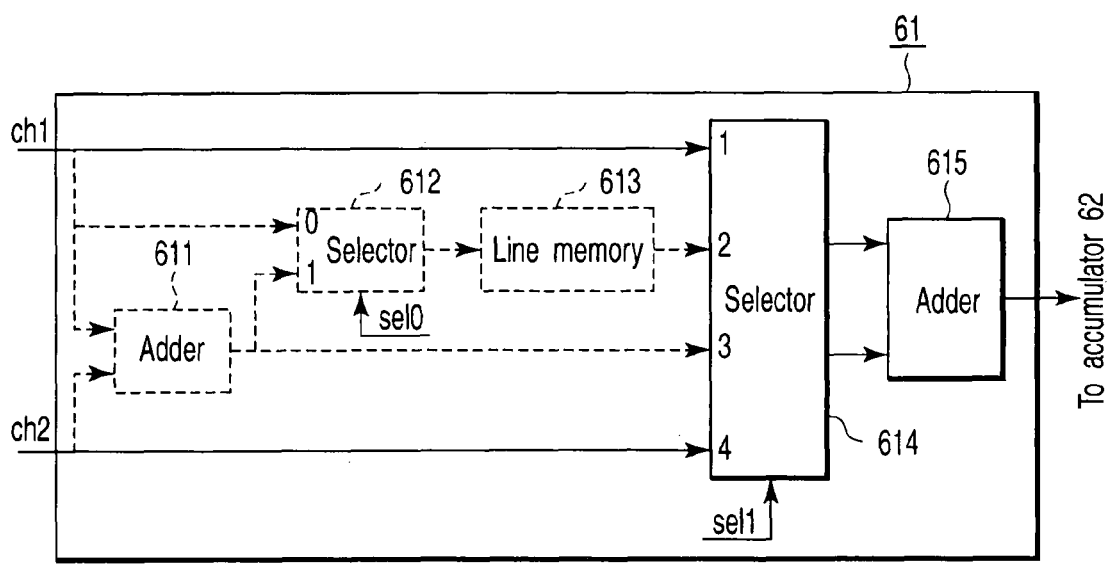
FIG. 8 is a block diagram to explain setting of an AF evaluation value calculating unit 60 when the imaging unit of FIG. 5 is used.

In the image pickup apparatus shown in FIG. 1, when the imaging unit shown in FIG. 5 is used, portions shown by a broken line in FIG. 6, FIG. 7 and FIG. 8 are not used. Thus, the selector 33 selects the image data from the resizer 32. In the selector 51 of the AE evaluation value calculating unit 50, the select signal sel1 of the selector 515 and the select signal sel2 of the selector 516 are both set to "0". In the Y generator 61 of the AF evaluation value calculating unit 60, the select signal sel1 of the selector 614 is set to "1" and "4".

Figure 9:
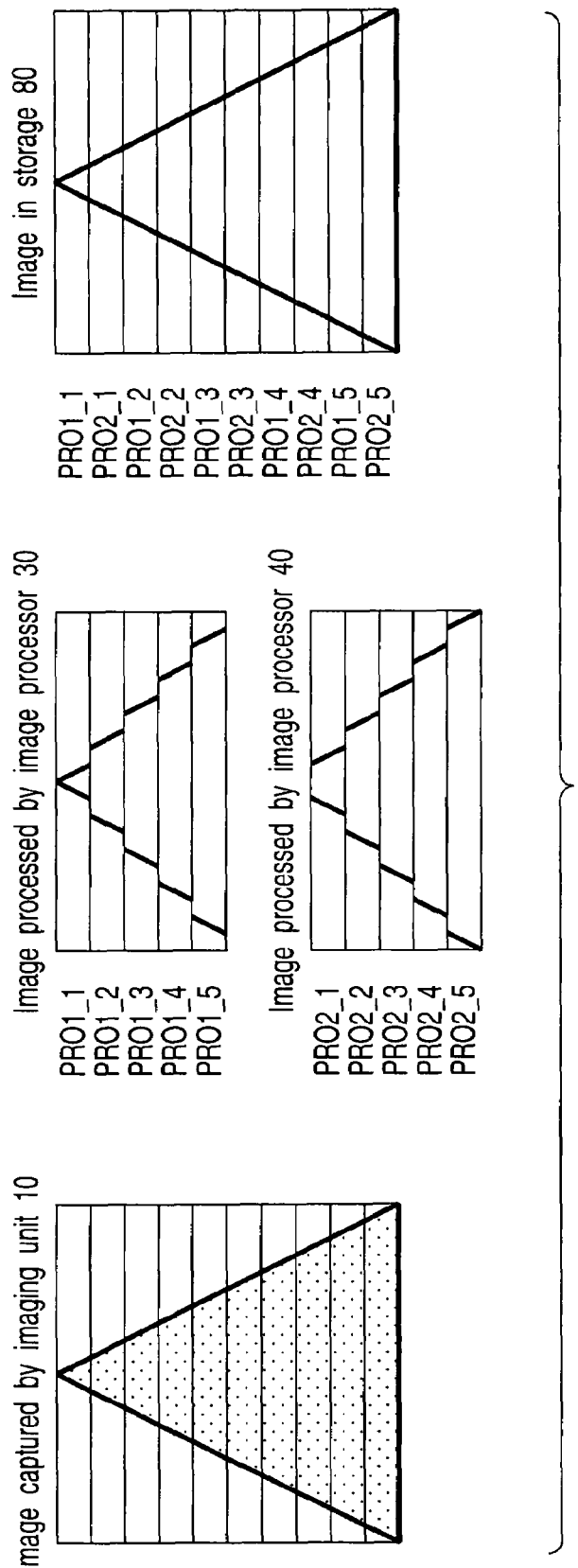
FIG. 9 is a view to explain image processing executed by the image processors 30 and 40 corresponding to the imaging unit 10 shown in FIG. 5.

FIG. 9 is a view to explain image processing executed by the image processors 30 and 40 corresponding to the imaging unit 10 shown in FIG. 5. As described above, the imaging unit 10 inputs an odd-line imaging signal equivalent to one line by one pixel to the preprocessor 20 for one horizontal period using the channel ch1 in accordance with a clock signal. The preprocessor 20 executes preprocessing with respect to the input imaging signal, and then outputs it to the image processor 30. The LPF 31 and the resizer 32 of the image processor 30 execute image processing with respect to the input imaging signal to obtain image data. The selector 33 selects the image data, and then outputs it to the DMAIF 35. Simultaneously, the imaging unit 10 inputs an even-line imaging signal equivalent to one line by one pixel to the preprocessor 20 for one horizontal period using the channel ch2 in accordance with a clock signal. The preprocessor 20 executes preprocessing with respect to the input imaging signal, and then outputs it to the image processor 40. The LPF 41 and the resizer 42 of the image processor 40 execute image processing with respect to the input imaging signal to obtain image data. The LPF 41 and the resizer 42 output the image data to the DMAIF 44.

The address controllers 34 and 43 control a write address when the DMAIFs 35 and 44 write the image data. Specifically, these controllers control the write address so that the image data from the resizer 32 and the image data from the resizer 42 are alternately written in the storage 80 by one line. In this way, the following result is obtained; namely, image processing is executed with respect to the imaging signal captured by the imaging unit 10.

Figure 10:
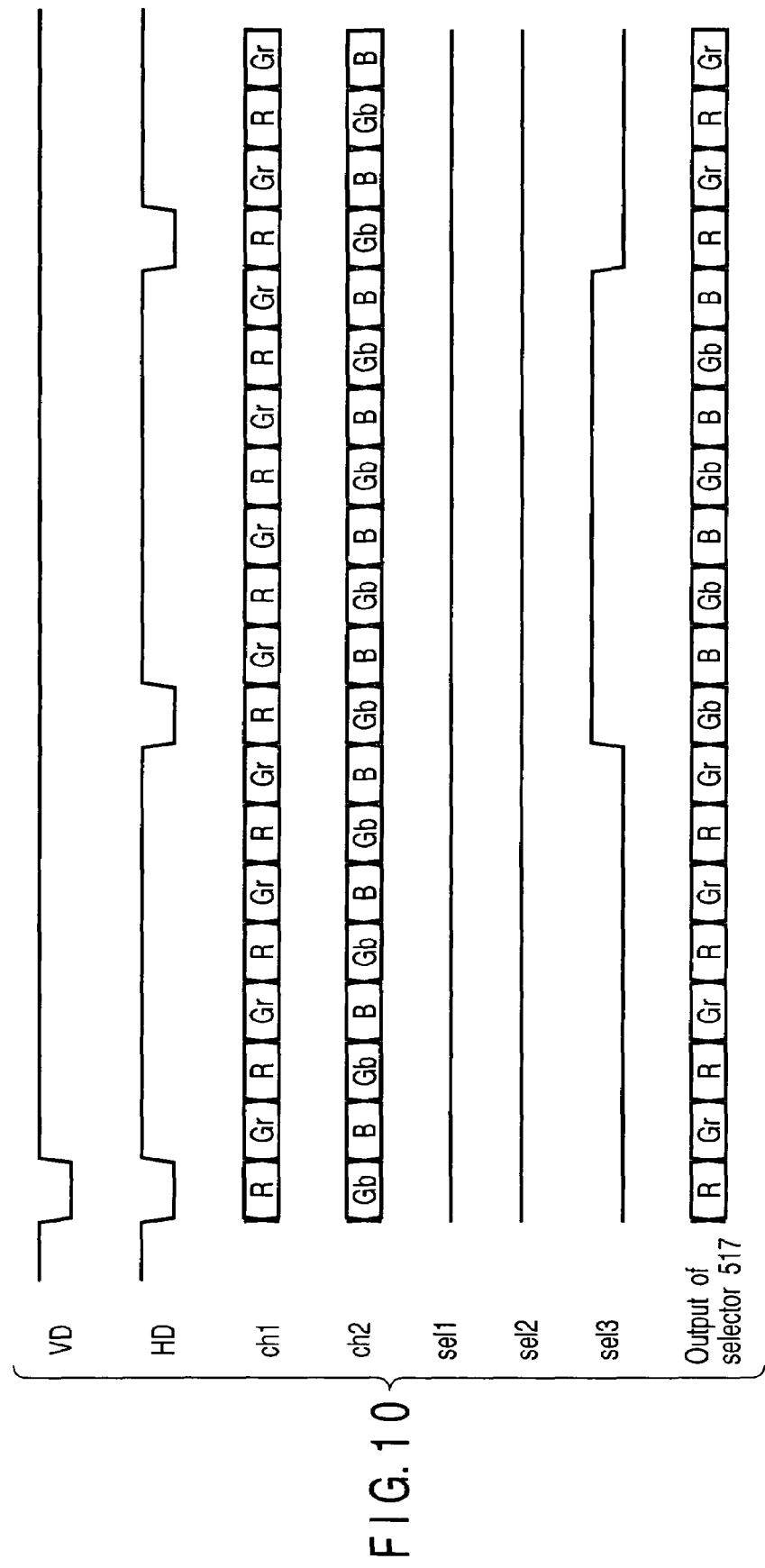
FIG. 10 is a timing chart to explain an AE evaluation value operation executed by the AE evaluation value calculating unit 50 corresponding to the imaging unit 10 shown in FIG. 5.

FIG. 10 is a timing chart showing an AE evaluation value operation executed by the AE evaluation value calculating unit 50 corresponding to the imaging unit 10 shown in FIG. 5. In FIG. 10, there are shown a vertical synchronizing signal VD, a horizontal synchronizing signal HD, an output of the channel ch1 of the imaging unit 10, and an output of the channel ch2 of the imaging unit 10. Further, in FIG. 10, there are shown the select signal sel1 of the selector 515, the select signal sel2 of the selector 516, the select signal sel3 of the selector 517, and an output from the selector 517.

When the vertical synchronizing signal VD is input to the imaging unit 10, reading of an imaging signal equivalent to one frame is started. Thereafter, every time the horizontal synchronizing signal HD is input, an odd-line imaging signal equivalent to one line is input by one pixel to the preprocessor 20 from the channel ch1 in accordance with a clock signal. The preprocessor 20 executes preprocessing with respect to the input imaging signal, and then outputs it to the FF 511, the adder 513 and the selector 515 of the selector unit 51. In this case, the select signal sel1 of the selector 515 is set to "0". Thus, the selector 515 selects the imaging signal from the preprocessor 20, and then output it to the selector 517.

On the other hand, an even-line imaging signal equivalent to one line is input by one pixel to the preprocessor. 20 from the channel ch2 in accordance with a clock signal. The preprocessor 20 executes preprocessing with respect to the input imaging signal, and then outputs it to the FF 512, the adder 514 and the selector 516 of the selector unit 51. In this case, the select signal sel2 of the selector 516 is set to "0". Thus, the selector 516 selects the imaging signal from the preprocessor 20, and then outputs it to the selector 517.

As depicted in FIG. 10, the select signal sel3 of the selector 517 is set as "0" in an odd-line horizontal period, while it is set as "1" in an even-line horizontal period. In this way, the selector 517 selects the imaging signal from the channel ch1 in the odd-line horizontal period, and then outputs it to the accumulator 52. Moreover, the selector 517 selects the imaging signal from the channel ch2 in the even-line horizontal period, and then outputs it to the accumulator 52. Namely, the output of the selector 517 is as shown in FIG. 10, and the imaging signal captured by the imaging unit 10 is input to the accumulator 52 in the order of the Bayer array. In this way, the accumulator 52 can operate an AE evaluation value.

The AE evaluation value is operated, and thereafter, the DMAIF 54 writes the AE evaluation value in the storage 80 under the control by the address controller 53. Then, the AE evaluation value is evaluated, and thereby, a shooting exposure condition is determined. The foregoing evaluation is carried out using the following known techniques such as a technique of evaluating the AE evaluation value every color and a technique of collectively evaluating a part area in an image screen. The detailed explanation is herein omitted.

Figure 11:
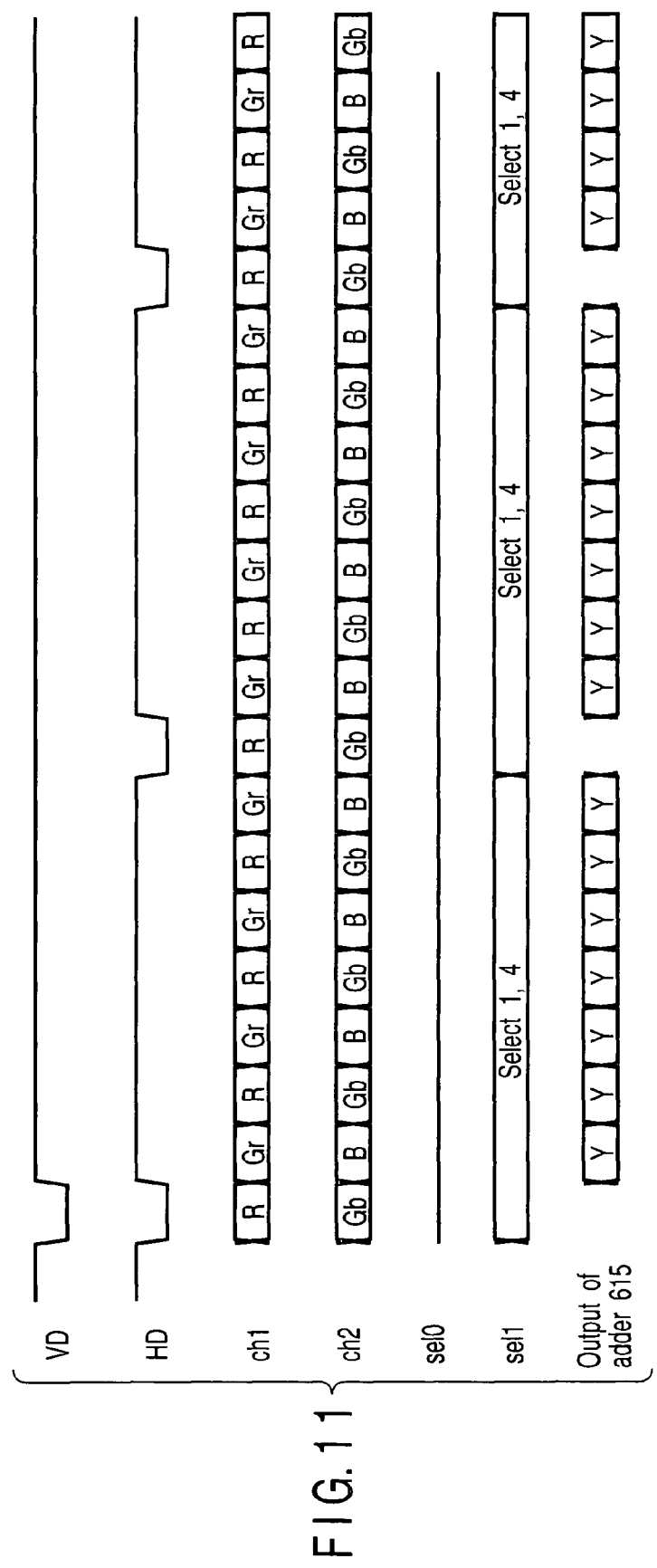
FIG. 11 is a timing chart to explain an AF evaluation value operation executed by the AF evaluation value calculating unit 60 corresponding to the imaging unit 10 shown in FIG. 5.

FIG. 11 is a timing chart showing an AF evaluation value operation executed by the AF evaluation value calculating unit 60 corresponding to the imaging unit 10 shown in FIG. 5. In FIG. 11, there are shown a vertical synchronizing signal VD, a horizontal synchronizing signal HD, an output of the channel ch1 of the imaging unit 10, an output of the channel ch2 of the imaging unit 10, a select signal sel1 of the selector 614, and an output of the adder 615.

When the vertical synchronizing signal VD is input to the imaging unit 10, reading of the imaging signal equivalent to one frame is started. Thereafter, every time the horizontal synchronizing signal HD is input, an odd-line imaging signal equivalent to one line is input from the channel ch1 to the preprocessor 20 by one pixel in accordance with a clock signal. The preprocessor executes preprocessing with respect to the input imaging signal, and then outputs it to the adder 611, the selector 612 and the selector 614 in the Y generator 61. In this case, the select signal sel1 of the selector 614 is set to "1" and "4". Thus, the selector 614 selects the imaging signals from the preprocessor 20, and then outputs them to the adder 615.

On the other hand, an even-line imaging signal equivalent to one line is input from the channel ch2 to the preprocessor 20 by one pixel in accordance with a clock signal. The preprocessor executes preprocessing with respect to the input imaging signal, and then outputs it to the adder 611 and the selector 614 in the Y generator 61. In this case, the select signal sel1 of the selector 614 is set to "1" and "4". Thus, the selector 614 selects the imaging signals from the preprocessor 20, and then outputs them to the adder 615.

The adder 615 multiplies each color of the input imaging signals by a predetermined coefficient, and thereafter, adds it together to generates a Y signal, and then outputs it to the accumulator 62. For example, if NTSC is given, the following relationship is given between a color signal and the Y signal.

$Y=0.3R+0.59G+0.11B$

Where, $G=(Gr+Gb)/2$.

The Y signal thus generated is accumulated every color in the accumulator 62, and thus, an AF evaluation value is operated.

The AF evaluation value is operated, and thereafter, the DMAIF 64 writes the AF evaluation value in the storage 80 under the control by the address controller 63. Image contrast is evaluated from the AF evaluation value. A lens is actuated so that shooting lens position having the highest image contrast is focused. The foregoing method is the known technique; therefore, the detailed explanation is omitted.

Figure 12:
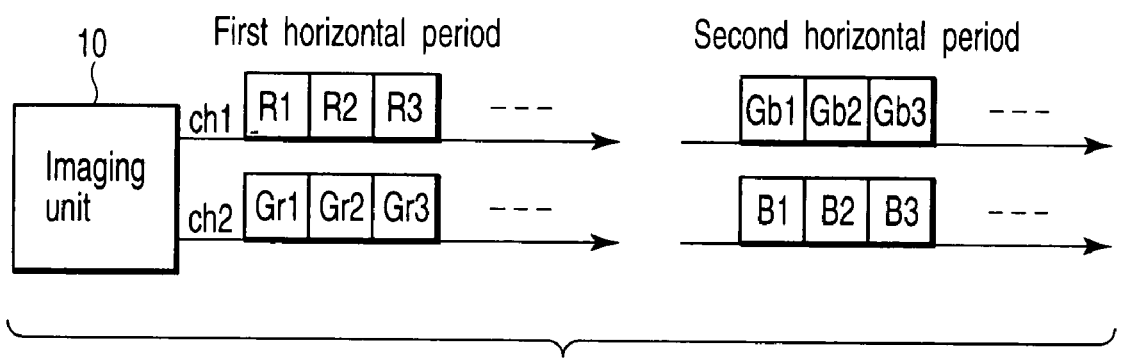
FIG. 12 is a view to explain a second configuration example of the imaging unit 10.

The operation corresponding to the imaging unit 10 outputting two kinds of imaging signals shown in FIG. 12 will be described. The imaging unit 10 shown in FIG. 12 has two output channels, that is, a channel 1 (ch1) and a channel 2 (ch2). The imaging unit 10 shown in FIG. 12 outputs an imaging signal of an odd-column pixel (R or Gr in the Bayer array) for one horizontal period (1H) from the channel ch1. In this case, the foregoing imaging signal is given as a first imaging signal. Moreover, the imaging unit 10 outputs an imaging signal of an even-column pixel (Gr, B in the Bayer array) for one horizontal period (1H) from the channel ch2. In this case, the foregoing imaging signal is given as a second imaging signal. In FIG. 12, the same color imaging signal only is output for one horizontal period.

Figure 13:
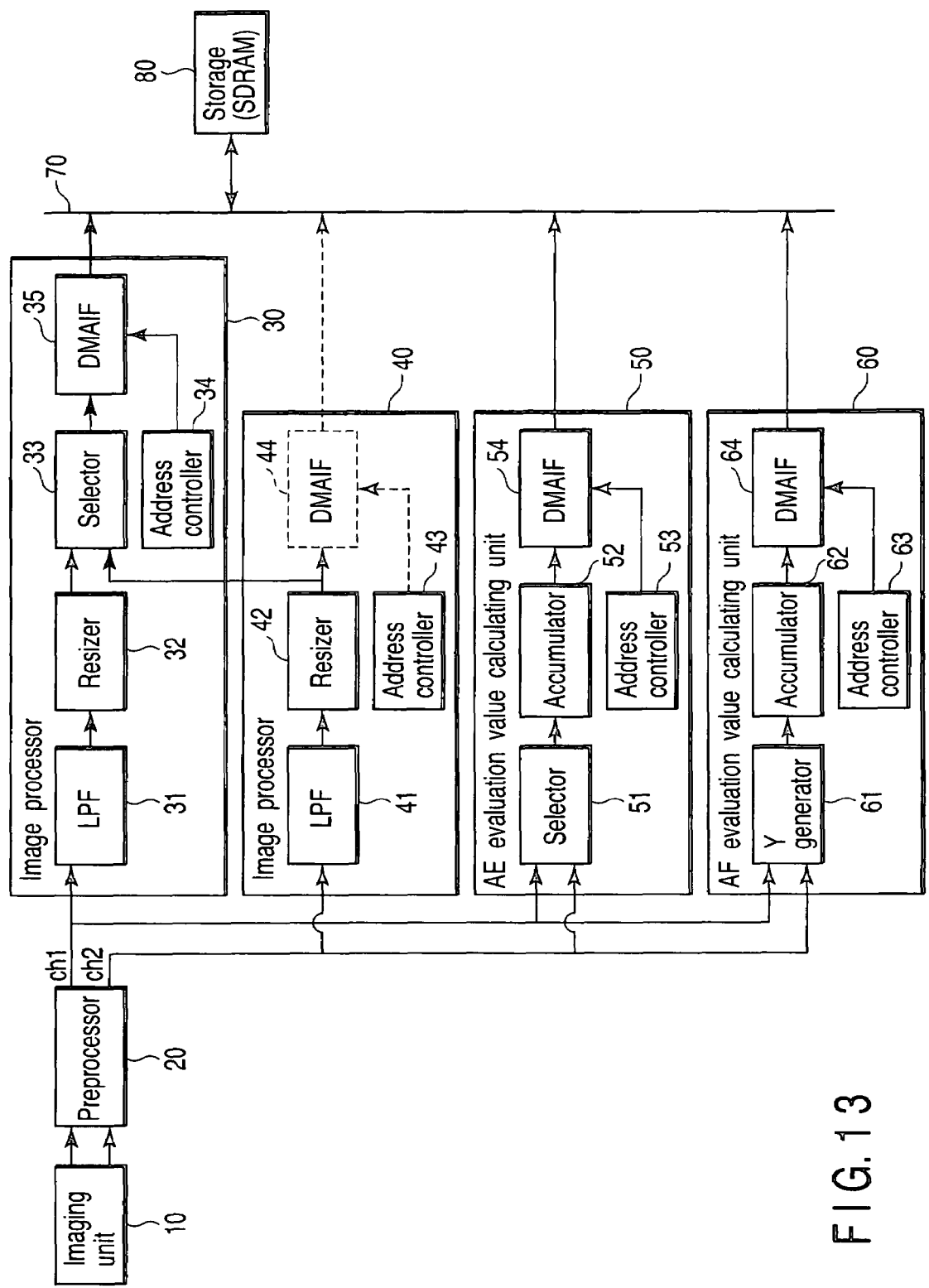
FIG. 13 is a block diagram to explain setting of image processors 30 and 40 when the imaging unit of FIG. 12 is used.

In the image pickup apparatus shown in FIG. 1, when the imaging unit shown in FIG. 12 is used, portions shown by a broken line in FIG. 13, FIG. 14 and FIG. 15 are not used. Thus, the DMAIF 44 is not used. In the selector 51 of the AE evaluation value calculating unit 50, the select signal sel1 of the selector 515 and the select signal sel2 of the selector 516 are both set to "1". In the Y generator 61 of the AF evaluation value calculating unit 60, the select signal sel1 of the selector 612 is set to "2" and "3".

The image processing executed by the image processors 30 and 40 corresponding to the imaging unit 10 shown in FIG. 12 will be hereinafter described. As described above, an odd-column imaging signal is input from the channel ch1 of the imaging unit 10 to the preprocessor 20 by one pixel in accordance with a clock signal. The preprocessor 20 executes preprocessing with respect to the input imaging signal, and then outputs it to the image processor 30. The LPF 31 and the resizer 32 of the image processor 30 execute image processing with respect to the input imaging signal to obtain an image data. Then, the resizer 32 outputs the image data to the selector 33. Simultaneously, an even-column imaging signal is input from the channel ch2 of the imaging unit 10 to the preprocessor 20 by one pixel in accordance with a clock signal. The preprocessor 20 executes preprocessing with respect to the input imaging signal, and then outputs it to the image processor 40. The LPF 41 and the resizer 42 of the image processor 40 execute image processing with respect to the input imaging signal to obtain an image data. Then, the resizer 42 outputs the image data to the selector 33.

The selector 33 alternately selects image data input from the resizers 32 and 42 by one pixel, and then outputs it to the DMAIF 35. The address controller 34 controls a write address when the DMAIF 35 writes the image data. Specifically, when the selector 33 selects image data equivalent to a predetermined pixel (e.g., one line), the selected image data is controlled so that it is written in the storage in the selected order. In this way, image processing is executed with respect to the imaging signal captured by the imaging unit 10.

Figure 16:
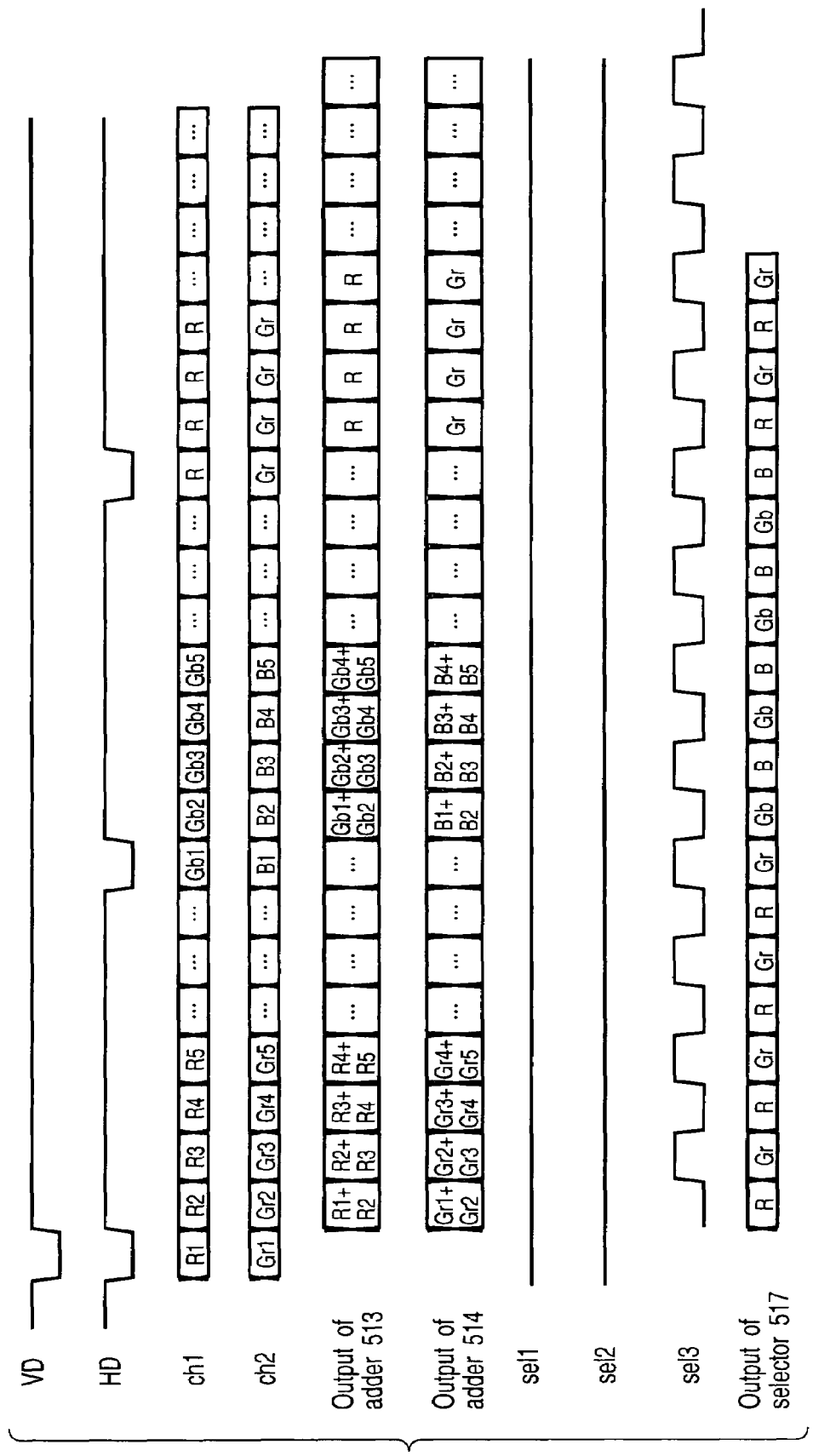
FIG. 16 is a timing chart to explain an AE evaluation value operation executed by the AE evaluation value calculating unit 50 corresponding to the imaging unit 10 shown in FIG. 12.

FIG. 16 is a timing chart showing an AE evaluation value operation executed by the AE evaluation value calculating unit 50 corresponding to the imaging unit 10 shown in FIG. 12. In FIG. 16, there are shown a vertical synchronizing signal VD, a horizontal synchronizing signal HD, an output of the channel ch1 of the imaging unit 10, and an output of the channel ch2 of the imaging unit 10. Further, in FIG. 10, there are shown each output of adders 513 and 514, each output from the select signal sel1 of the selector 515, the select signal sel2 of the selector 516, the select signal sel3 of the selector 517, and the selector 517.

When the vertical synchronizing signal VD is input to the imaging unit 10, reading of the imaging signal equivalent to one frame is started. Thereafter, every time the horizontal synchronizing signal HD is input, an odd-column imaging signal equivalent to one line is input from the channel ch1 to the preprocessor 20 by one pixel in accordance with a clock signal. The preprocessor 20 executes preprocessing with respect to the input imaging signal, and then outputs it to the FF 511, the adder 513 and the selector 515 in the selector 51. The adder 513 adds the imaging signal held by the FF 511 and the imaging signal from the preprocessor 20, and then outputs the result to the selector 515. In this way, color components R and Gb fellows are independently added as shown in FIG. 16. In this case, the select signal sel1 of the selector 515 is set to "1". Thus, the selector 515 selects the imaging signal from the adder 513, and then outputs it to the selector 517.

On the other hand, an even-column imaging signal equivalent to one line is input from the channel ch2 to the preprocessor 20 by one pixel in accordance with a clock signal. The preprocessor 20 executes preprocessing with respect to the input imaging signal, and then outputs it to the FF 512, the adder 514 and the selector 516 in the selector 51. The adder 514 adds the imaging signal held by the FF 512 and the imaging signal from the preprocessor 20, and then outputs the result to the selector 516. In this way, color components Gr and B fellows are independently added as shown in FIG. 16. In this case, the select signal sel2 of the selector 516 is set to "1". Thus, the selector 516 selects the imaging signal from the adder 514, and then outputs it to the selector 517.

As seen from FIG. 16, the select signal sel3 of the selector 517 alternately sets "0" and "1" every clock after second clock. Therefore, the output of the selector 517 is as shown in FIG. 16. The imaging signal captured by the imaging unit 10 is input to the accumulator in the order of the Bayer array. In this way, the accumulator 52 can operate the AE evaluation value.

Figure 17:
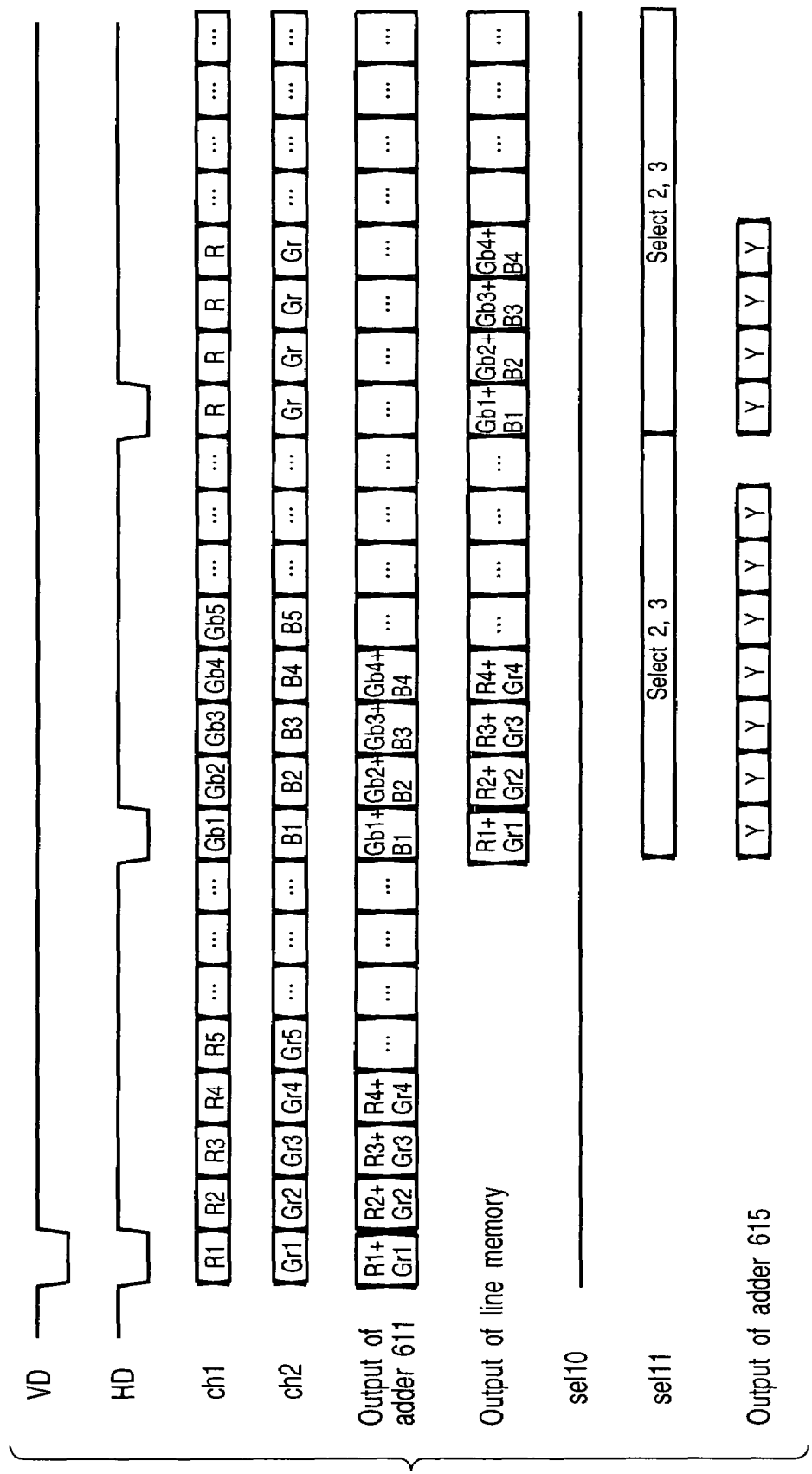
FIG. 17 is a timing chart to explain an AF evaluation value operation executed by the AF evaluation value calculating unit 60 corresponding to the imaging unit 10 shown in FIG. 12.

FIG. 17 is a timing chart showing an AF evaluation value operation executed by the AF evaluation value calculating unit 60 corresponding to the imaging unit 10 shown in FIG. 12. In FIG. 17, there are shown a vertical synchronizing signal VD, a horizontal synchronizing signal HD, an output of the channel ch1 of the imaging unit 10, and an output of the channel ch2 of the imaging unit 10. Further, in FIG. 10, there are shown an output of adder 611, an output of the line memory 613, the select signal sel0 of the selector 612, the select signal sel1 of the selector 614, an output of the adder 615.

When the vertical synchronizing signal VD is input to the imaging unit 10, reading of the imaging signal equivalent to one frame is started. Thereafter, every time the horizontal synchronizing signal HD is input, an odd-column imaging signal equivalent to one line is input from the channel ch1 to the preprocessor 20 by one pixel in accordance with a clock signal. The preprocessor 20 executes preprocessing with respect to the input imaging signal, and then outputs it to the adder 611, the selector 612 and the selector 614 in the Y generator 61.

On the other hand, an even-column imaging signal equivalent to one line is input from the channel ch2 to the preprocessor 20 by one pixel in accordance with a clock signal. The preprocessor 20 executes preprocessing with respect to the input imaging signal, and then outputs it to the adder 611 and the selector 614 in the Y generator 61.

The adder 611 each color of the imaging signals from the channels ch1 and ch2 by a predetermined coefficient, and thereafter, adds it together, and then outputs it to the selectors 612 and 614. In this case, the foregoing coefficient is equivalent to a coefficient for obtain the Y signal. Namely, the adder 611 is supplied with two only of four components for obtaining the Y signal every clock. Thus, the coefficient corresponding to the foregoing two components is multiplied, and thereafter, addition is made. In this case, the select signal sel0 of the selector 612 is set to "1". Therefore, the selector 612 selects the imaging signal from the adder 611, and then outputs the result to the line memory 613. When the imaging signal equivalent to one line is input to the line memory 613, the imaging signal is output from the line memory 613.

In this case, the select signal sel1 of the selector 614 is set to "2" and "3". Thus, the selector 614 selects the imaging signals from the adder 611 and the line memory 613, and then outputs them to the adder 615. As seen from FIG. 17, the imaging signals from the adder 611 and the line memory 613 are selected, and thereby, all imaging signals of each color required for generating the Y signal are provided.

The adder 615 adds the input imaging signals, and thereby, generates the Y signal, and thereafter, outputs it to the accumulator 62. The accumulator 62 accumulates the Y signal thus generated every color, and thereby, the AF evaluation value is operated.

The operation of an imaging unit 10 shown in FIG. 18 will be hereinafter described. The imaging unit 10 shown in FIG. 18 is composed of two imaging units 10*a* and 10*b*. For this reason, the preprocessor 20 is composed of preprocessors 20*a* and 20*b*.

Each of the imaging units 10*a* and 10*b* is composed of an imaging optical system, and an imaging device arranged in the rear of the imaging optical system. Each imaging device of the imaging units 10*a* and 10*b* outputs an imaging signal according to the Bayer array shown in FIG. 2. Moreover, the preprocessor 20*a* executes preprocessing with respect to the imaging signal obtained by the imaging unit 10*a*. The preprocessor 20*b* executes preprocessing with respect to the imaging signal obtained by the imaging unit 10*b*.

Image processing executed by the image processors 30 and 40 corresponding to the imaging unit shown in FIG. 18 will be hereinafter described. As described above, the Bayer array imaging signal is output from each of the imaging units 10*a* and 10*b*. Thus, any one of the image processors is operated to execute image processing. Or, for example, the image processor 30 executes image processing for still image shooting while the image processor 40 executes image processing for a moving image. As described above, the foregoing two image processors execute different image processing. In this case, each image data obtained by the image processors 30 and 40 is independently stored in the storage 80.

Figure 19:
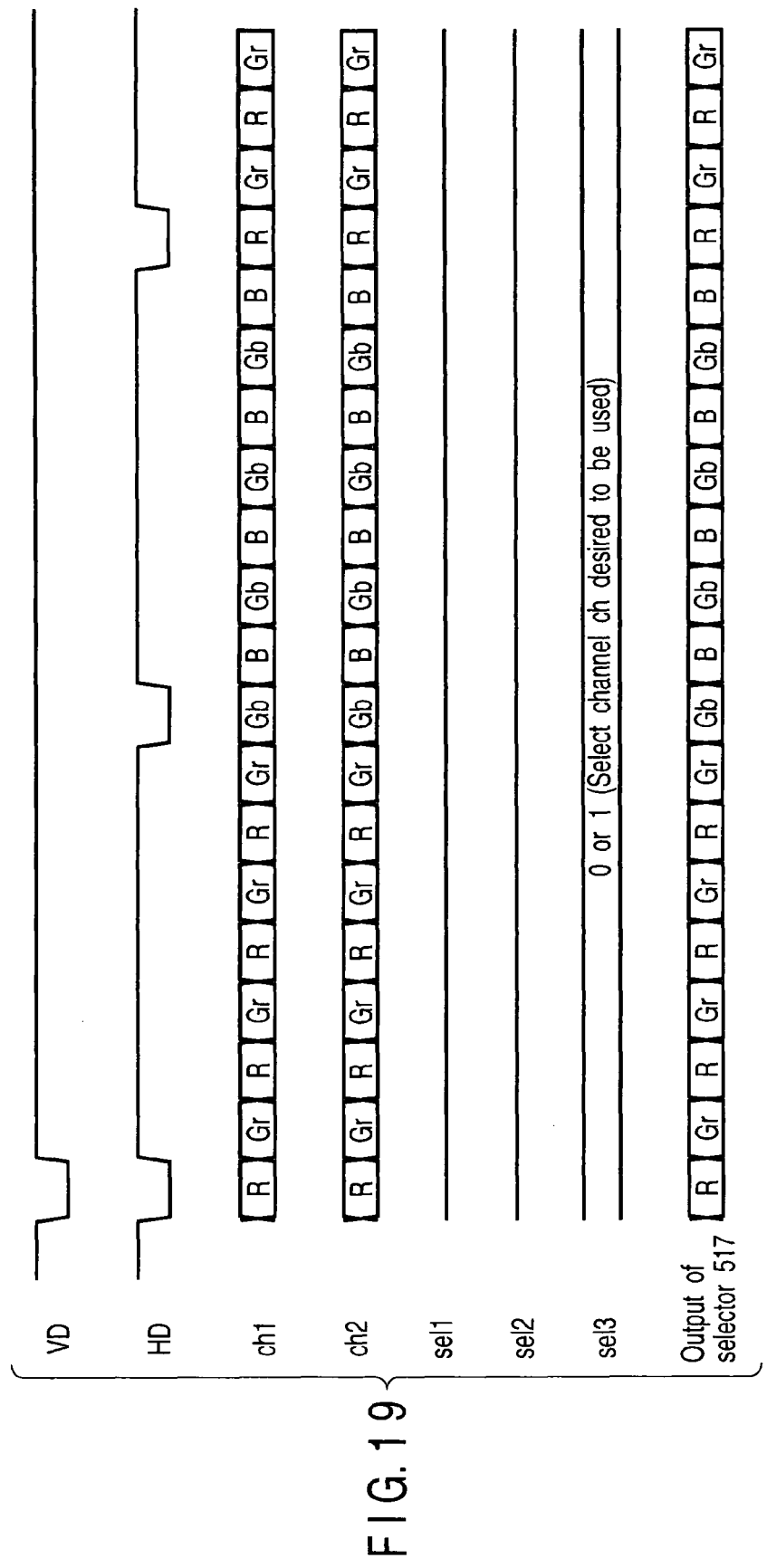
FIG. 19 is a timing chart to explain an AE evaluation value operation executed by the AE evaluation value calculating unit 50 corresponding to the imaging unit 10 shown in FIG. 18.

FIG. 19 is a timing chart showing an AE evaluation value operation executed by the AE evaluation value calculating unit 50 corresponding to the imaging unit 10 shown in FIG. 18. As depicted in FIG. 19, a Bayer array imaging signal is output from each of the imaging units 10*a* and 10*b*. Thus, the select signal sel1 of the selector 515 and the select signal sel2 of the selector 516 are both set to "0". In this case, the channel is set to a channel that desires to use the select signal sel3 of the selector 517. In this way, the AE evaluation value operation is possible using desired one of the imaging units 10*a* and 10*b*.

Figure 20:
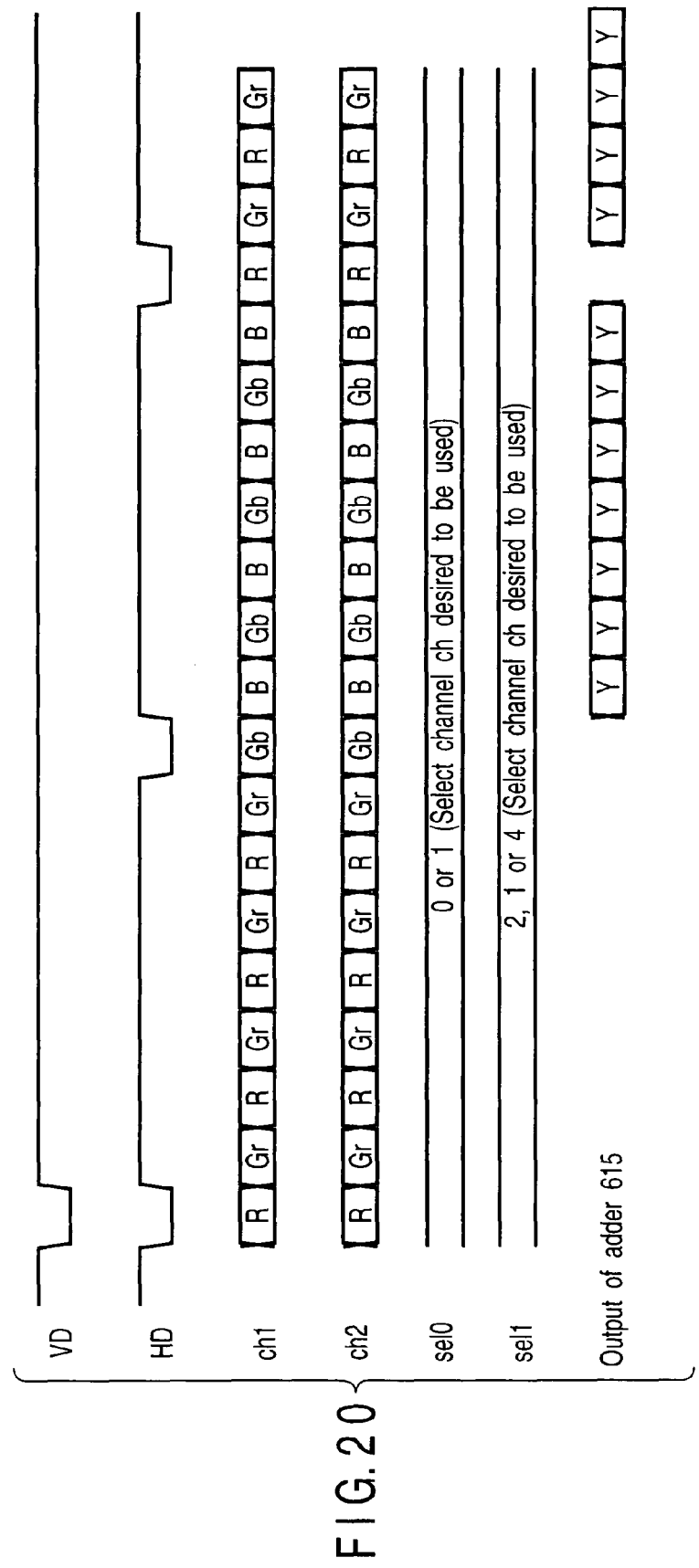
FIG. 20 is a timing chart to explain an AF evaluation value operation executed by the AF evaluation value calculating unit 60 corresponding to the imaging unit 10 shown in FIG. 18.

FIG. 20 is a timing chart showing an AF evaluation value operation executed by the AF evaluation value calculating unit 60 corresponding to the imaging unit 10 shown in FIG. 18. As shown in FIG. 20, a Bayer array imaging signal is output from each of the imaging units 10*a* and 10*b*. Thus, the select signal sel0 of the selector 612 is set to a channel that desires to use. The select signal sel1 of the selector 614 is set to "2", and "1" or "4", and thereby, an AF evaluation value operation is possible using desired one of the imaging units 10*a* and 10*b*.

Of course, setting of the selector shown in FIG. 19 and FIG. 20 is applicable to only one imaging unit outputting a Bayer array imaging signal.

According to the foregoing embodiment, setting of the selectors is changed in the image processor 30, the AE evaluation value calculating unit 50 and the AF evaluation value calculating unit 60. In this way, image processing, AE evaluation value operation and AF evaluation value operation are possible in accordance with some kinds of imaging units 10 having different configuration.

According to the foregoing embodiment, the imaging unit 10 outputs two different imaging signals. In this case, even if the imaging unit outputs three or more different imaging signals, the foregoing embodiment is applicable.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image pickup apparatus comprising:
   an imaging unit which outputs two kinds of imaging signals including a first imaging signal and a second imaging signal;
   a first calculating unit to which the two kinds of imaging signals are simultaneously input, and which selectively processes the two kinds of imaging signals to generate an AE evaluation value;
   a second calculating unit to which the two kinds of imaging signals are simultaneously input, which selectively processes the two kinds of imaging signals to generate a luminance signal, and generates an AF evaluation value from the generated luminance signal; and
   an image processor to which the two kinds of imaging signals are simultaneously input, and which executes image processing with respect to the two kinds of imaging signals to obtain an image data.

2. The apparatus according to claim 1, wherein the first calculating unit includes:
   a first adder which adds the first imaging signal equivalent to continuously output two pixels;
   a second adder which adds the second imaging signal equivalent to continuously output two pixels;
   a first selector which selects either of the first imaging signal from the imaging unit and an imaging signal from the first adder;
   a second selector which selects either of the second imaging signal from the imaging unit and an imaging signal from the second adder;
   a third selector which selects either of an imaging signal from the first selector and an imaging signal from the second selector; and
   an AE evaluation value generator which generates the AE evaluation value from an imaging signal from the third selector.

3. The apparatus according to claim 1, wherein the second calculating unit includes:
   a third adder which adds the first and second imaging signals from the imaging unit;
   a fourth selector which selects either of the first imaging signal from the imaging unit and an imaging signal from the third adder;
   a holder which holds an imaging signal from the fourth selector;
   a fifth selector which selects either of the first and second imaging signals from the imaging unit, and an imaging signal from the holder and an imaging signal from the third adder;
   a fourth adder which adds two kinds of imaging signals from the fifth selector to generate a luminance signal; and
   an AF evaluation value generator which generates the AF evaluation value from the luminance signal from the fourth adder.

4. The apparatus according to claim 1, further comprising:
   a storage which stores the image data obtained by the image processor,
   the image processor including:
   a first image processor which executes image processing with respect to the first imaging signal to obtain an image data;
   a second image processor which executes image processing with respect to the second imaging signal to obtain an image data; and
   a storage processor which selectively writes the image data obtained by the first image processor and the image data obtained by the second image processor in the storage.

5. The apparatus according to claim 2, wherein the imaging unit has arrayed pixels and simultaneously outputs each of two pixel imaging signals adjacent to a vertical direction of neighboring two lines as the first and second imaging signals by one pixel every clock,
   the first selector selects the first imaging signal from the imaging unit, and the second selector selects the second imaging signal from the imaging unit, and further, the third selector alternately selects a first imaging signal from the firSt selector and a second imaging signal from the second selector every line.

6. The apparatus according to claim 3, wherein the imaging unit has arrayed pixels and simultaneously outputs each of two pixel imaging signals adjacent to a vertical direction of neighboring two lines as the first and second imaging signals by one pixel every clock,
   the fifth selector selects two of the first and second imaging signals from the imaging unit.

7. The apparatus according to claim 4, wherein the imaging unit has arrayed pixels and simultaneously outputs each of two pixel imaging signals adjacent to a vertical direction of neighboring two lines as the first and second imaging signals by one pixel every clock,
   the storage processor alternately writes the image data by each of the first and second image processors in the storage every line.

8. . apparatus according to claim 2, wherein the imaging unit has arrayed pixels and simultaneously outputs each of two pixel imaging signals adjacent to a horizontal direction of one line as the first and second imaging signals by one pixel every clock,
   the first selector selects an imaging signal from the first adder, and the second selector selects an imaging signal from the second adder, and further, the third selector alternately selects an imaging signal from the first selector and an imaging signal from the second selector every clock.

9. The apparatus according to claim 3, wherein the imaging unit has arrayed pixels and simultaneously outputs each of two pixel imaging signals adjacent to a horizontal direction of one line as the first and second imaging signals by one pixel every clock, the fourth selector selects an imaging signal from the third adder, and the fifth selector selects two of an imaging signal from the holder and an imaging signal from the third adder.

10. The apparatus according to claim 4, wherein the imaging unit has simultaneously outputs each of two pixel imaging signals having arrayed pixels and adjacent to a horizontal direction of one line as the first and second imaging signals by one pixel every clock, the storage processor alternately writes the image data by each of the first and second image processors in the storage every line.

11. The apparatus according to claim 1, wherein the imaging unit includes:

an imaging optical system which has first and second imaging optical systems;

a first imaging device which receives light from the first imaging optical system to output the first imaging signal; and a second imaging device which receives light from the second imaging optical system to output the second imaging signal, the image processor includes:

a first image processor which executes a first image processing with respect to the first imaging signal; and a second image processor which executes a second image processing different from the first image processing with respect to the second imaging signal.

12. The apparatus according to claim 11, wherein the first and second imaging devices are an imaging device for still image shooting and an imaging device for moving image shooting, respectively, and the first and second image processings are a still image shooting image processing and a moving image shooting image processing, respectively.

13. The apparatus according to claim 1, wherein a generation of the AE evaluation value by the first calculating unit, a generation of the AF evaluation value by the second calculating unit and image processing by the image processor are simultaneously carried out.

14. The apparatus according to claim 2, wherein a generation of the AE evaluation value by the first calculating unit, a generation of the AF evaluation value by the second calculating unit and image processing by the image processor are simultaneously carried out.

15. The apparatus according to claim 3, wherein a generation of the AE evaluation value by the first calculating unit, a generation of the AF evaluation value by the second calculating unit and image processing by the image processor are Simultaneously carried out.

16. The apparatus according to claim 4, wherein a generation of the AE evaluation value by the first calculating unit, a generation of the AF evaluation value by the second calculating unit and image processing by the image processor are simultaneously carried out.

17. The apparatus according to claim 11, wherein a generation of the AE evaluation value by the first calculating unit, a generation of the AF evaluation value by the second calculating unit and image processing by the image processor are simultaneously carried out.

18. The apparatus according to claim 12, wherein a generation of the.AE evaluation value by the first calculating unit, a generation of the AF evaluationvalue by the second calculating unit and image processing by the image processor are simultaneously carried out.

19. A signal processor processing two kinds of imaging signals including a first imaging signal and a second imaging signal, comprising:

a first calculating unit to which the two kinds of imaging signals are simultaneously input, and which selectively processes the two kinds of imaging signals to generate an AE evaluation value;

a second calculating unit to which the two kinds of imaging signals are simultaneously input, which selectively processes the two kinds of imaging signals to generate a luminance signal, and generates an AF evaluation value from the generated luminance signal; and an image processor to which the two kinds of imaging signals are simultaneously input, and which executes image processing with respect to the two kinds of imaging signals to obtain an image data.

* * * * *